United States Patent [19]
Chapman

[11] Patent Number: 5,150,569
[45] Date of Patent: Sep. 29, 1992

[54] INTEGRATED PROPULSION SYSTEM

[75] Inventor: William I. Chapman, Birmingham, Mich.

[73] Assignee: Williams International Corporation, Walled Lake, Mich.

[21] Appl. No.: 628,108

[22] Filed: Dec. 14, 1990

[51] Int. Cl.⁵ .............................................. F02C 7/26
[52] U.S. Cl. .................................. 60/39.142; 60/743; 244/135 R
[58] Field of Search ............................ 60/39.142, 743; 244/135 R

[56] References Cited

U.S. PATENT DOCUMENTS 2,602,292  7/1952  Buckland et al. ............... 60/743
2,929,206  3/1960  Davenport ................. 60/39.142
2,943,815  7/1960  Besson ...................... 244/135 R Primary Examiner—Richard A. Bertsch
Assistant Examiner—Howard R. Richman
Attorney, Agent, or Firm—Lyon & Delevie

[57] ABSTRACT

A propulsion system comprises a gas turbine engine having sructurally integrated support systems that maximize structural efficiency and minimize cost.

4 Claims, 5 Drawing Sheets

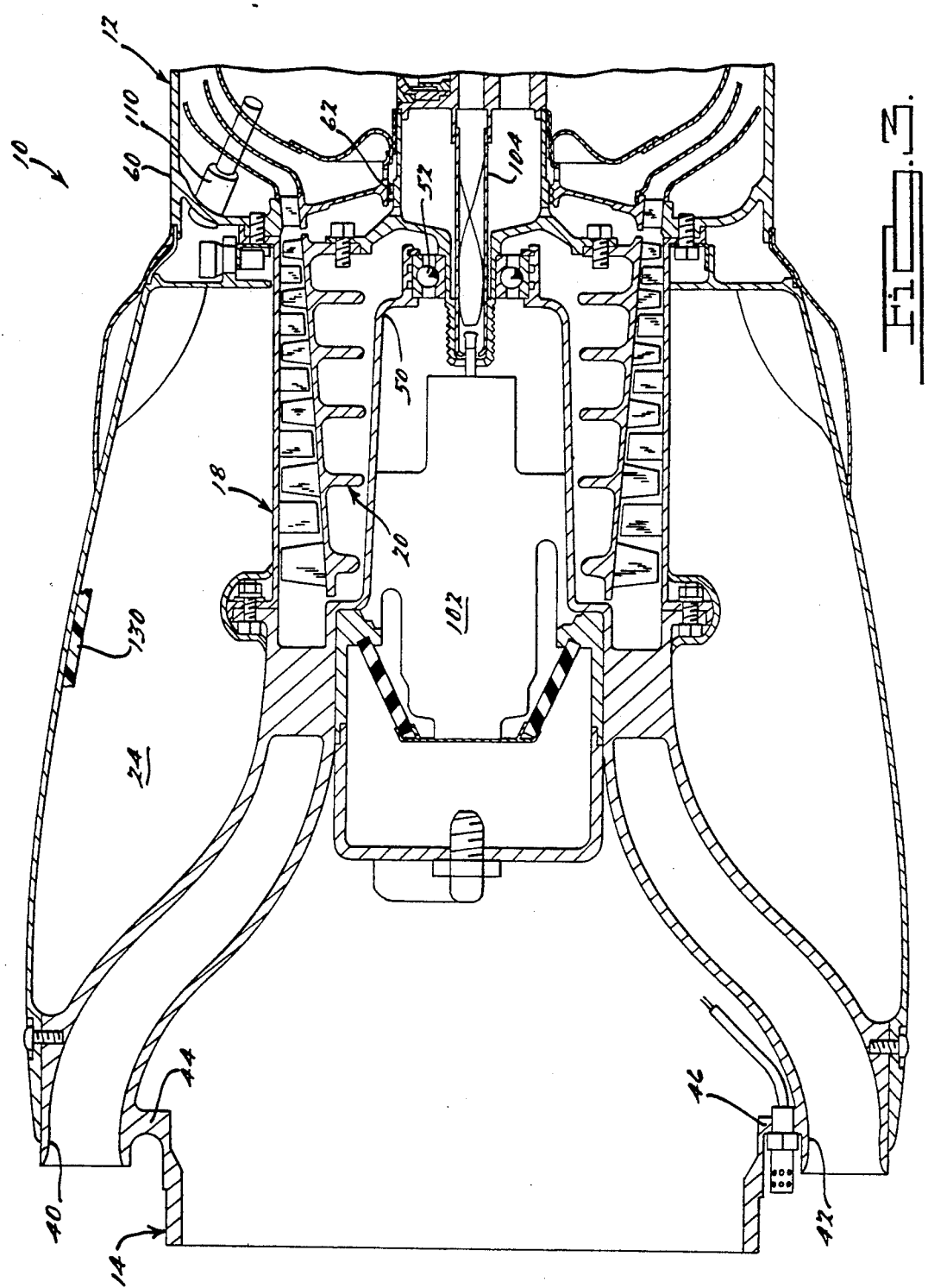

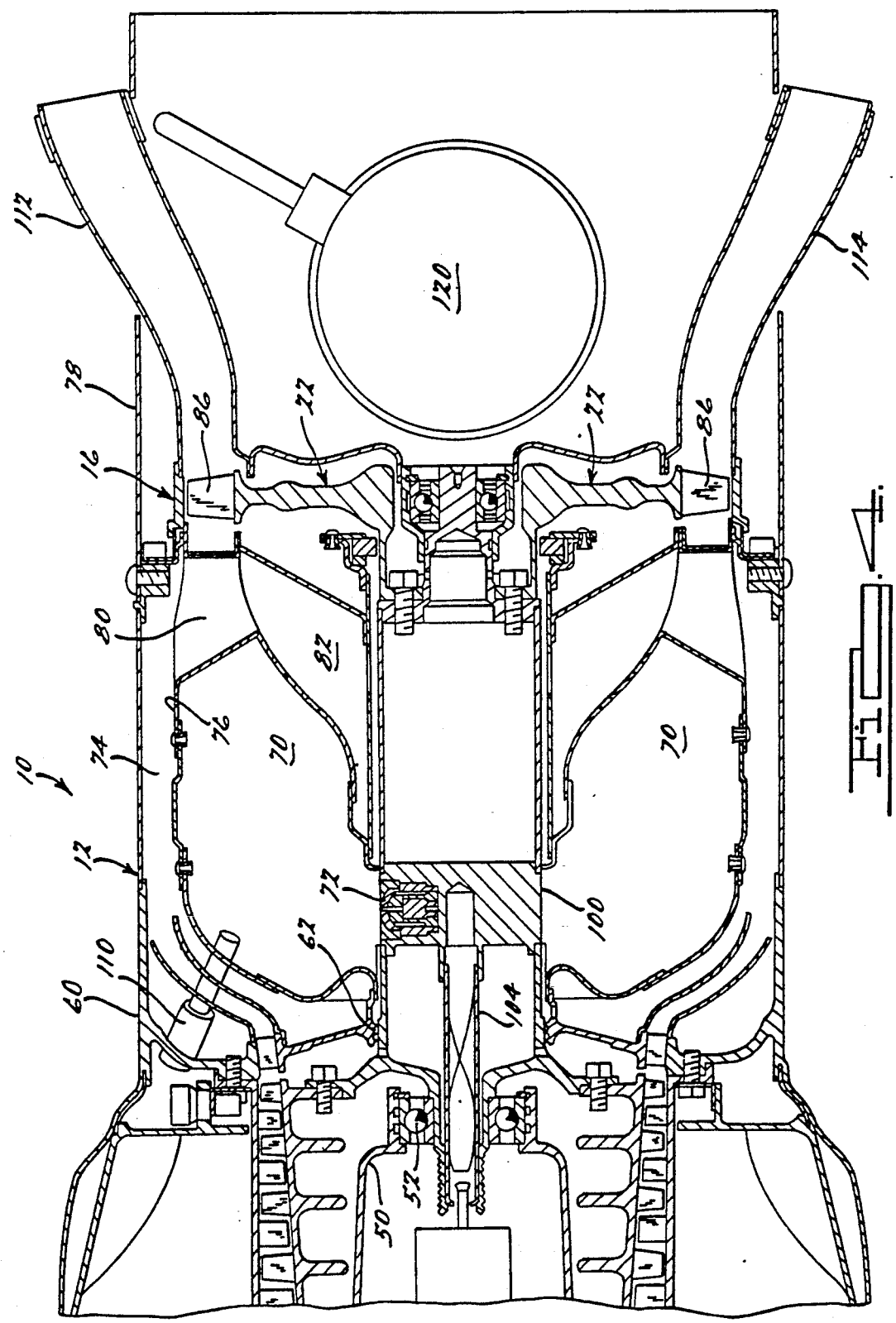

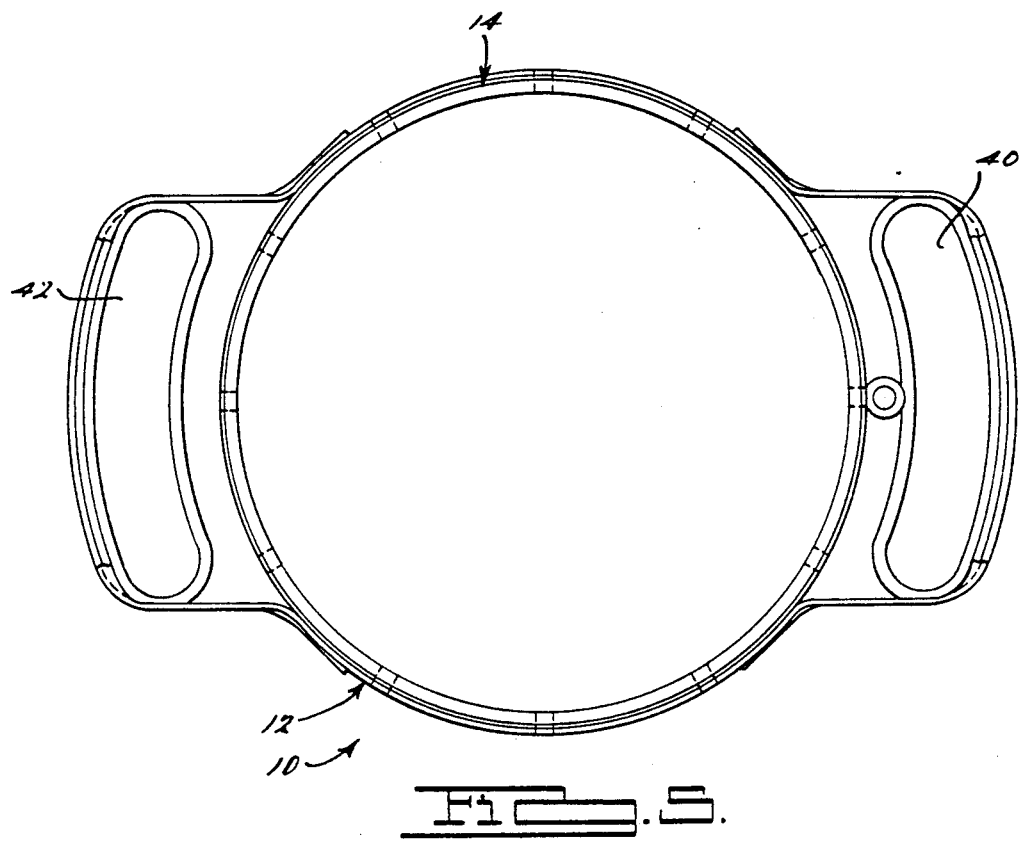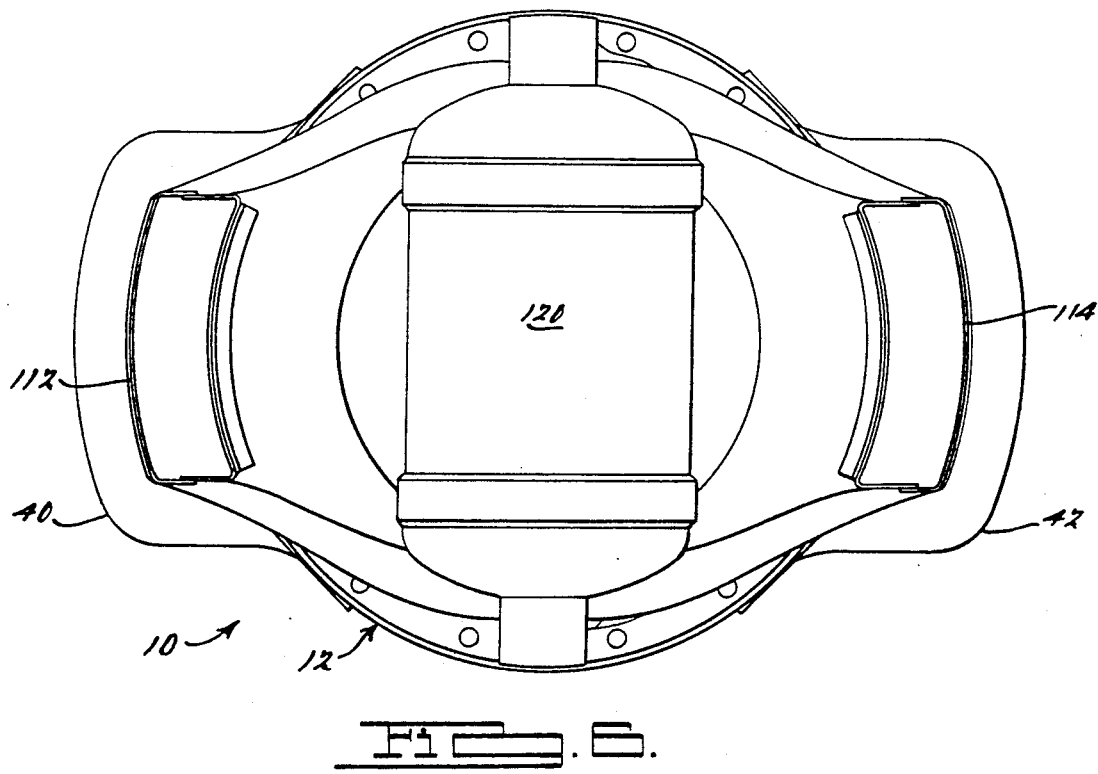

INTEGRATED PROPULSION SYSTEM

BACKGROUND OF THE INVENTION

The invention relates to an integrated power system comprising a gas turbine engine and its associated support systems.

Gas turbine engines require a number of support systems in order to render the engine operational. Such systems comprise, for example, intake, exhaust, fuel supply, electrical, cooling, lubrication, mounting, starting, and control systems. The associated systems are typically mounted externally of the engine or installed within the vehicle and connected to the engine by means of ducts, tubing, hoses, wires, harnesses, etc. Interfaces between the engine and its associated components become increasingly complex a the number of associated systems increases.

Another problem is presented where the propulsion system comprises the load transfer mechanism between the fore and aft sections of an aircraft. When this air frame configuration is used the propulsion system must be capable of withstanding loads experienced during aircraft maneuvers, e.g. vehicle roll, pitch and yaw.

SUMMARY OF THE INVENTION

The integrated propulsion system of the instant invention comprises a module wherein a gas turbine engine and its associated support systems are integrated, greatly simplifying component interface and installation problems. The module includes a forward assembly comprising an annular integral fuel tank, air inlet, fuel pump, front compressor rotor bearing support, and compressor rotor and stator. An intermediate assembly comprises the combustor, the turbine nozzle and turbine. The rear assembly comprises the turbine rotor bearing support, exhaust ducts, and starting system. Self-lubricated bearings are used throughout eliminating the need for an external lubrication system. In the disclosed embodiment of the invention, a pyrotechnic starter and igniter provide one-shot operation. External air crank and ignition or a conventional starter and start procedure can be used for multiple starts, if desired.

It is to be noted that the propulsion module of the engine is capable of functioning as a load transfer mechanism between the fore and the aft sections of an air frame.

BRIEF DESCRIPTION OF THE DRAWINGS

FIGS. 3 and 4 comprise a composite view taken in the direction of the arrow "3-4" of FIGS. 1-2.

FIG. 5 is a view taken in the direction of the arrow "5" of FIG. 1, and

FIG. 6 is a view taken in the direction of the arrow "6" of FIG. 2.

DETAILED DESCRIPTION OF THE PREFERRED EMBODIMENT OF THE INVENTION

Figure 1:
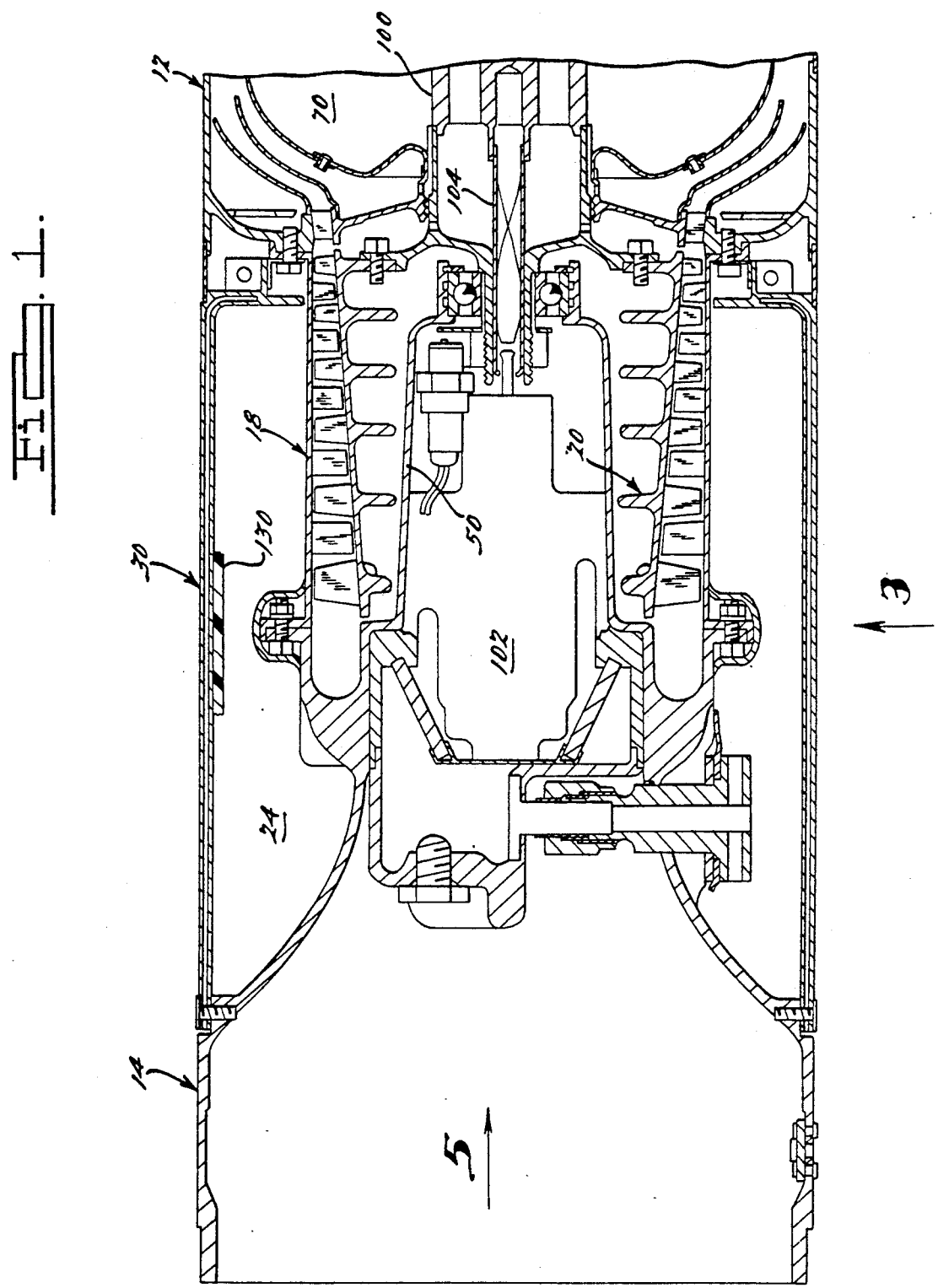
FIGS. 1 and 2 comprise a composite cross-sectional elevation of an integrated propulsion system constructed in accordance with the instant invention.
Figure 2:
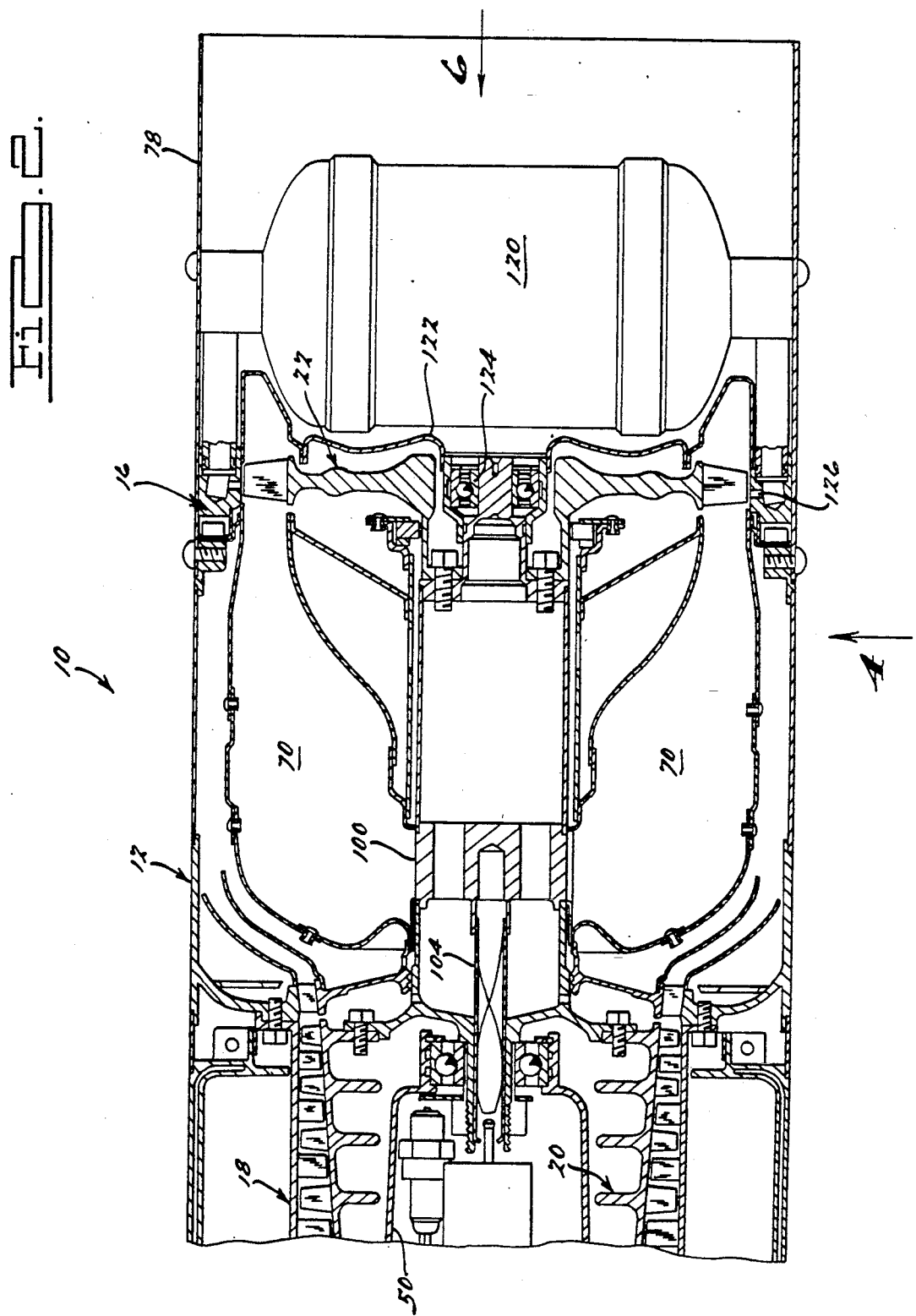

Referring to FIG. 1 through an integrated propulsion system 10 constructed in accordance with a constructed embodiment of the instant invention, comprises a generally cylindrical structurally integrated assembly to which all of the components of the system ar either attached, contained internally, or formed integrally therewith.

More specifically, major structural components of the system 10 comprise a combustor housing 12, air inlet housing 14, compressor stator 18, and rear housing 78. A compressor rotor 20 is housed internally of the compressor stator 18. A turbine rotor 22 is disposed in the turbine shroud 16. A fuel tank 24 of annular configuration envelopes the air compressor stator 18. An annular outer sheath 30 surrounds the fuel tank 24 for the protection thereof. The integrated propulsion system 10 is designed to carry both vehicle structural and dynamic loads.

More specifically, the configuration of the inlet housing 14 is of multiple scoop Pitot design. In a constructed embodiment, a pair of inlet scoops 40 and 42 are provided with small standoffs 44 and 46, respectively, to act as boundary-layer diverters.

A front bearing support 50 is integral with the air inlet housing 14 for the support of a front bearing 52 which in turn supports the compressor rotor 20.

The compressor stator 18 and rotor 20 comprise one-piece castings that are cast to near net-shape with machining limited to mounting surfaces and stator and rotor vane tips.

The rear end of the compressor stator 18 is supported by a radially extending bulkhead 60 that also supports a rotor shaft seal 62.

An annular, axial flow combustor 70 is fueled by three shaft-mounted/shaft-fed rotatable fuel injectors 72 (one of which is shown). Combustion and cooling air from the compressor 20 passes through an annular chamber that is defined in part by an outer wall 76 of the combustor 70, and in part by a tubular combustor housing 12 that is attached by the bulkhead 60 to the compressor stator 18. Air is fed to the combustor 70 by a plurality of hollow vanes 80 that extend between the passage 74 and the interior of a combustor plenum 82.

The annular, axial flow combustor 70 has a generally toroidal primary combustion zone with a single vortex primary recirculation pattern, promoting quick starting, efficient combustion, and good stability over a wide range of operating conditions. The primary combustion zone discharges directly aft into a secondary/dilution zone where the combustion process is completed and the bulk gas flow diluted by air from the plenum 82. The dilution zone maintains a stable air flow and provides an evenly distributed hot gas mixture that flows past the vanes 80 to impinge upon the blades 86 of the turbine rotor 22. The annular combustor 70 is an assembly of stainless steel sheet material elements that are stamped, formed, and riveted to form a structurally integrated assembly.

The combustor 70 is fueled by a rotatable nozzle assembly comprising the nozzles 72 which are supported by a turbine shaft 100. Fuel is introduced at the forward end of the shaft 100 and flows rearwardly from a fuel pump 102 through a concentric fuel delivery tube 104 to the nozzles 72 thereafter to be atomized by centrifugal force.

The combustor assembly 70 is defined in part by the plurality of hollow vanes 80 that carry compressed air radially inwardly whereupon the air flows forwardly and radially outwardly to provide air to the combustion zone of the combustor 70. Air flow through the vanes 80 effects cooling thereof permitting the engine to operate at turbine inlet temperatures in excess of 2100° F.

A pyrotechnic igniter 110 initiates combustion by firing across the spray from the fuel nozzles 72. The igniter 110 is housed in the bulkhead 60 of the combustor housing 12.

The rear shroud 78 serves as a support for a cylindrical gas generator 120, rear bearing support 122 and a rear bearing 124.

A pyrotechnic propellant, or if desired, compressed air, is disposed internally of the generator 120 which, upon electrical activation by an external electrical signal, discharges gas through nozzles 126 against the vanes 86 of the turbine rotor 22. It is to be noted that gases generated by the propellant generator 120 spin the rotor 22, shaft 100, and compressor rotor 20 by impinging on the turbine blades 86 on the turbine disk 22. Rotation of the compressor rotor 20 provides enough air and fuel flow through the engine 10 to support ignition whereupon the igniter 110 sprays a magnesium/teflon fueled flame into the combustor 70 to effect ignition. It will be appreciated that the on-board start system may be replaced, if desired, with a remote hot gas generator, the output of which is ducted into impingement upon the secondary turbine rotor blades 82. Alternatively, compressed air from a remote air compressor may be utilized to start the engine 10, or the engine may be started by windmilling if launched at a high enough flight speed, for example, 0.5 mach number.

The annular space radially outwardly of the compressor stator 18 and between the inlet housing 14 and combustor housing 12 defines the tank 24. An annular, collapsible fuel bladder 130 lines the tank 24. The fuel tank 24 is pressurized by utilizing bleed air from the engine compressor 20 and is relieved by a conventional pressure-relief valve (not shown) thereby to provide regulated pressure to produce controlled fuel flow from the tank 24. Tank pressurization during the start sequence may be obtained by bleeding gas from the start cartridge 120.

In the run condition, fuel flow is from the tank 24 through the fuel control and pump 102 through the fuel feed tube 104 to the mounting area of the injectors 72. Fuel is distributed to each of the injectors 72 which spray the fuel radially outwardly into the combustion zone of the combustor 70. It is to be noted that as fuel flows through the fuel feed tube 104, it provides cooling to the inner race of the forward bearing 52.

While the preferred embodiment of the invention has been disclosed, it should be appreciated that the invention is susceptible of modification without departing from the scope of the following claims.

I claim:

1. An integrated propulsion system comprising:
   an air intake;
   a compressor stator supported by said air intake;
   a front turbine shaft bearing supported by said air intake;
   a compressor rotor on the front end of said turbine shaft;
   an annular combustion chamber communicating with the outlet end of said stator; said turbine shaft being disposed internally of said combustion chamber;
   a fuel passage having a fuel discharge nozzle therein disposed internally of said turbine shaft and rotatable therewith;
   a turbine rotor on said turbine shaft;
   a rear housing supported by said combustion chamber and having a turbine exhaust duct and rear bearing for the turbine shaft; and
   an annular fuel tank coaxially related and radially aligned with said compressor stator.

2. The propulsion system of claim 1 comprising means for producing a fluid flow disposed aft of said turbine rotor, and means for directing said fluid to the turbine rotor for starting said engine.

3. An integrated propulsion system comprising:
   a multi-stage axial compressor comprising a tubular compressor stator having a plurality of internal vanes thereon;
   a cylindrical compressor rotor having a plurality of external vanes thereon complementary to the internal vanes on said stator, said compressor having an inlet end and an outlet end;
   a tubular combustor housing attached to and communicating with the outlet end of said stator;
   an annular combustion chamber disposed within said combustor housing;
   an annular fuel cell coaxially related and radially aligned with said compressor stator;
   a turbine shaft disposed internally of said combustion chamber and connected to said compressor rotor;
   a fuel passage disposed internally of said turbine shaft having a fuel nozzle rotatable therewith for the discharge of fuel into said combustion chamber;
   a turbine rotor on said turbine shaft having a plurality of blades on the periphery thereof;
   means disposed rearwardly of said turbine rotor for producing a fluid flow; and
   means for directing said fluid flow against the plurality of blades on said turbine rotor for starting said engine.

4. An integrated propulsion system comprising
   a frontal housing having an integral air intake;
   a tubular compressor stator supported by said frontal housing, said stator having a plurality of internal vanes thereon;
   a cylindrical compressor rotor having a plurality of external vanes thereon complementary to the internal vanes on said stator, said compressor rotor being journaled by said frontal housing;
   a tubular combustor case communicating with the outlet end of said compressor rotor;
   an annular combustion chamber disposed within said combustor case;
   an annular fuel cell coaxially related and radially aligned with said compressor stator;
   a turbine shaft disposed internally of said combustion chamber and connected to said compressor rotor, so as to be journaled by said frontal housing;
   a turbine rotor on said turbine shaft having a plurality of blades on the periphery thereof;
   engine starting means disposed aft of said turbine rotor for producing a fluid flow, and
   means for directing said fluid flow against the blades on said turbine rotor for starting said engine.

* * * * *